July 22, 1958   M. D. CORWIN   2,844,065
KEY AND KEYBOARD CONSTRUCTION
Filed Sept. 13, 1952   3 Sheets-Sheet 1
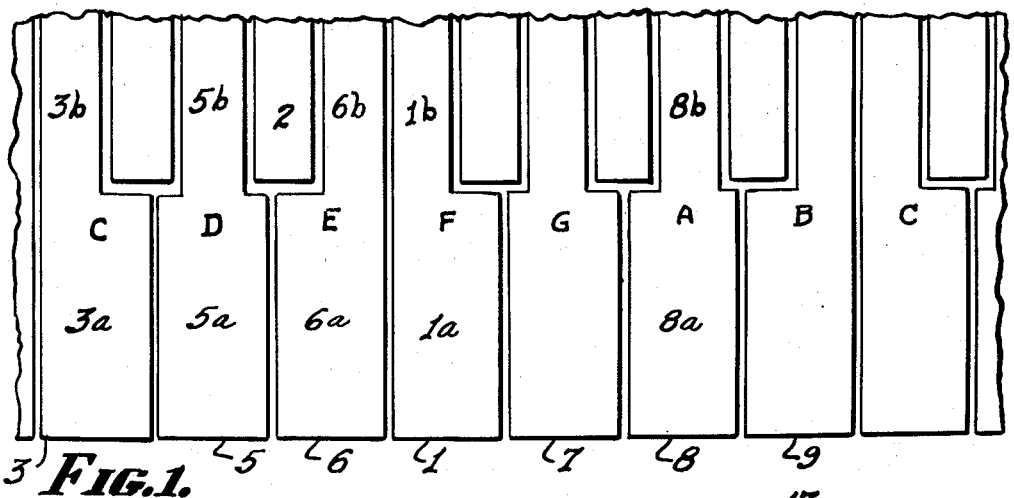
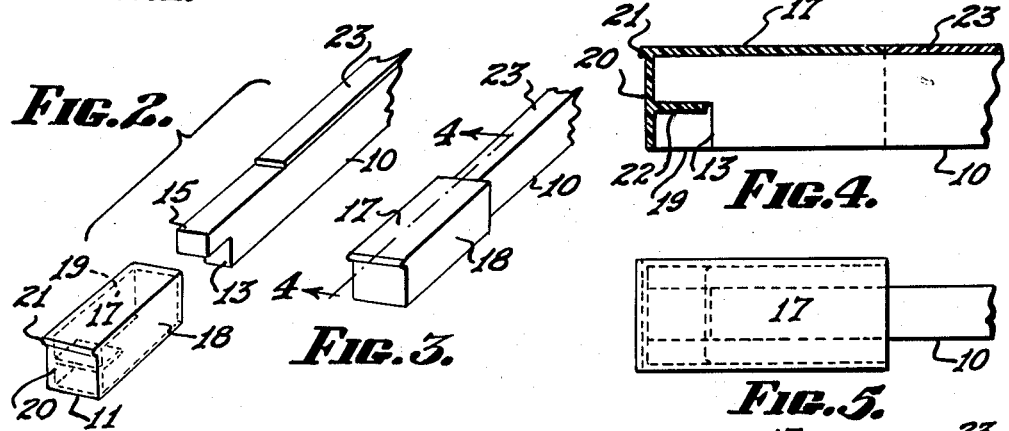
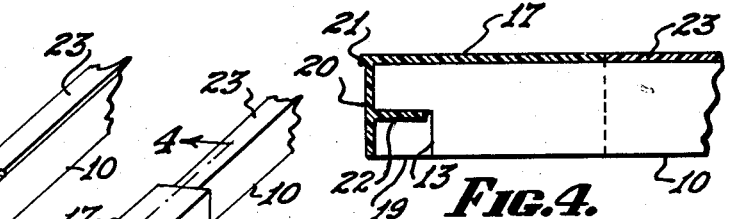
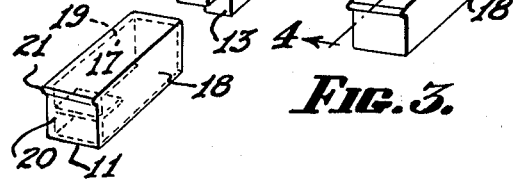
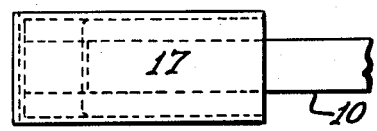
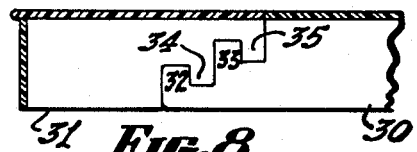
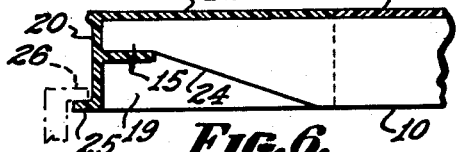
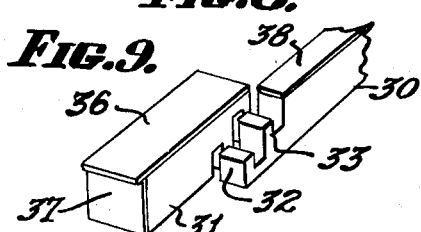
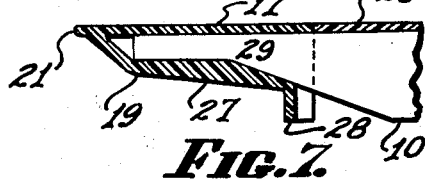
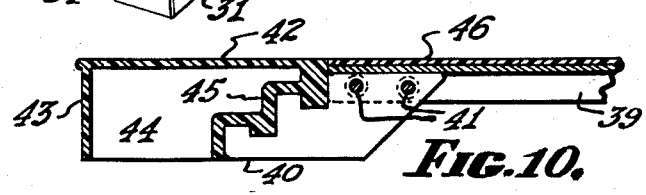
INVENTOR.
MERTON D. CORWIN,
BY Allen + Allen
ATTORNEYS.

July 22, 1958 M. D. CORWIN 2,844,065
KEY AND KEYBOARD CONSTRUCTION
Filed Sept. 13, 1952 3 Sheets-Sheet 2
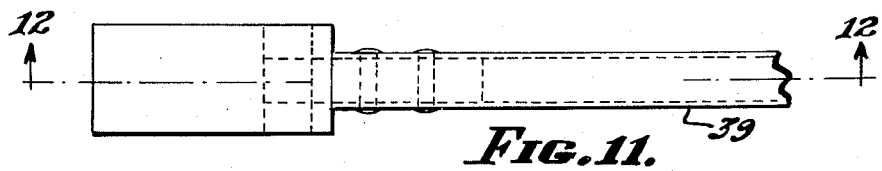
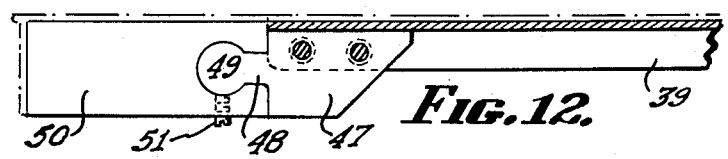
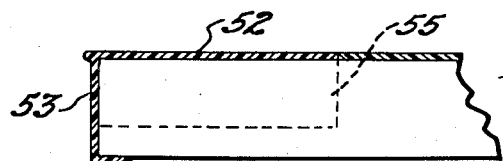
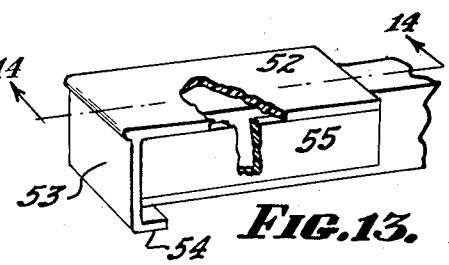
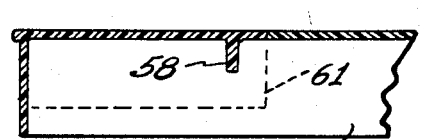
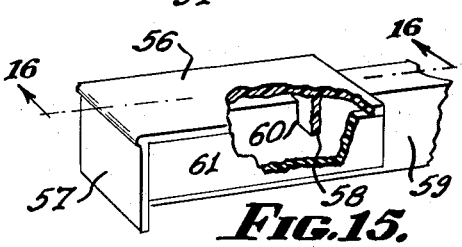
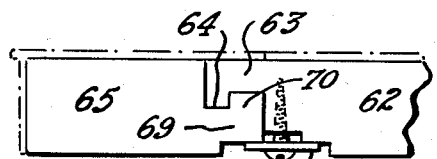
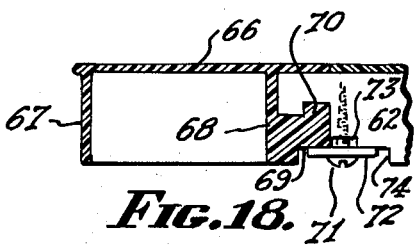
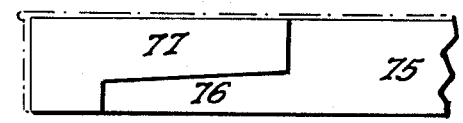
INVENTOR.
MERTON D. CORWIN,
BY Allen & Allen
ATTORNEYS.

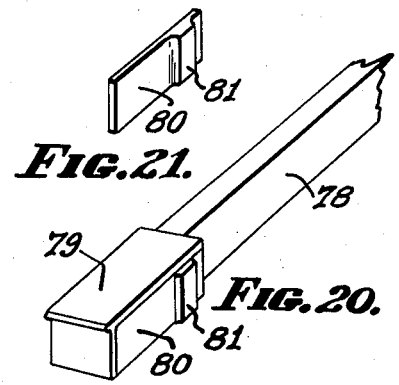
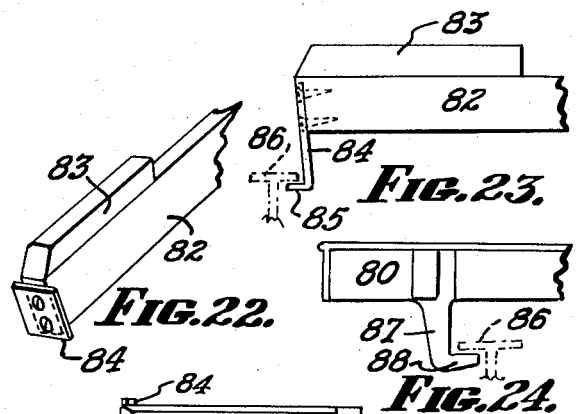
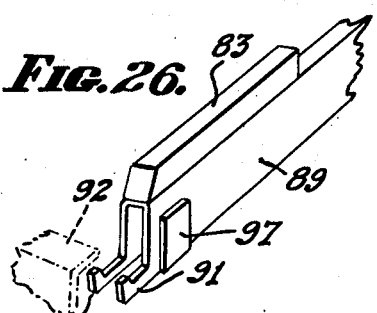
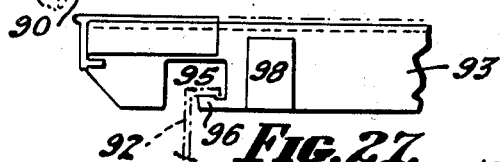
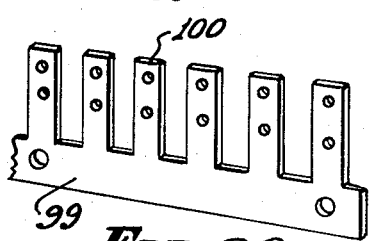
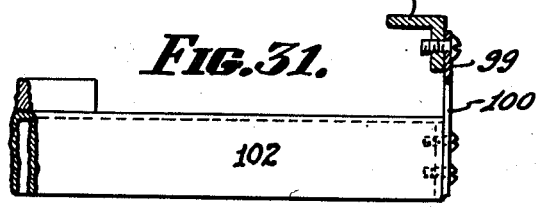
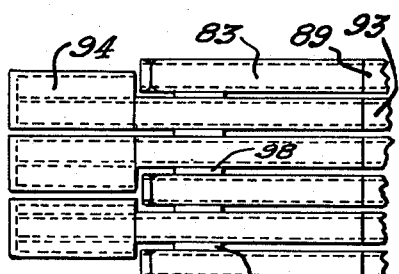
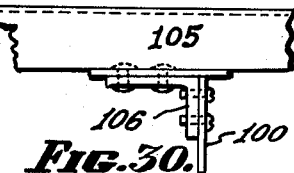
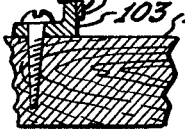

United States Patent Office

2,844,065
Patented July 22, 1958

2,844,065

KEY AND KEYBOARD CONSTRUCTION

Merton D. Corwin, Cincinnati, Ohio, assignor to The Baldwin Piano Company, a corporation of Ohio Application September 13, 1952, Serial No. 309,451

17 Claims. (Cl. 84—423)

My invention relates to the construction of keys and keyboards for musical instruments such as pianos or organs, and it has two primary objects. The first object is the provision of a new and advantageous construction for the individual keys of instruments, and methods of making them whereby substantial economies may be effected. The second main object has to do with the provision of simplified constructions for a keyboard assembly including new modes of guiding the keys, whereby again very substantial economies may be achieved.

These and other objects of the invention which will be set forth hereinafter or will be apparent to one skilled in the art upon reading this specification, I accomplish by that construction and arrangement of parts, and by those methods, of which I shall now describe certain exemplary embodiments. Reference is made to the accompanying drawings wherein:

Figure 1 is a partial plan view of a conventional keyboard.

Figure 2 is an exploded view showing one form of my key construction.

Figure 3 is a partial perspective view showing the parts of Figure 2 in assembled relationship.

Figure 4 is a partial sectional view taken along the section line 4—4 of Figure 3.

Figure 5 is a top plan view of the key.

Figure 6 is a partial sectional view of another form of key construction.

Figure 7 is a partial sectional view of a modification, in this instance one especially designed for an organ.

Figure 8 is a partial sectional view of another form of construction.

Figure 9 is an exploded view of the parts thereof.

Figure 10 is a variation of the type of construction shown in Figure 8 and embodying a metal shank.

Figure 11 is a plan view of another form of construction embodying a metal shank.

Figure 12 is a partial sectional view of the same construction taken along the section line 12—12 of Figure 11.

Figure 13 is a partial perspective view, with parts cut away, and

Figure 14 is a partial sectional view (taken along the section line 14—14 of Figure 13) of yet another modification.

Figure 15 is a partial perspective view with parts cut away to show interior construction, and Figure 16 is a partial sectional view (taken along the section line 16—16 of Figure 15) of yet another modification.

Figure 17 is a partial elevational view showing another mode of joining the fore-part to the shank of a key.

Figure 18 is a partial sectional view showing a modification of the same type of structure.

Figure 19 shows in partial elevation yet another mode of effecting such a juncture.

Figure 20 is a partial perspective view of a key showing a guiding means.

Figure 21 is a perspective view of an end filler plate with a guiding means.

Figure 22 is a partial perspective view of a so-called black key with guiding means.

Figure 23 is a partial elevational view of a black key provided with guiding and stop means.

Figure 24 is a partial elevational view of a so-called white key with stop means.

Figure 25 is a partial plan view of a key assembly showing front guiding means.

Figure 26 is a partial perspective view of a black key with stop means.

Figure 27 is a partial elevational view of a white key with stop means.

Figure 28 is a partial plan view of an assembly of the keys of Figures 26 and 27.

Figure 29 is a partial perspective view of a key pivoting means.

Figure 30 is a view partly in elevation and partly in section showing another type of pivoting means.

Figure 31 is a view partly in elevation and partly in section of a key showing yet another type of pivoting means.

It is well known that the keys and keyboard assemblies of musical instruments such as pianos and organs represent relatively a very large cost. This cost is to be found not only in the construction of the keys themselves but also in the modes employed for guiding, pivoting and controlling them. My invention offers solutions for both problems, which may be employed separately or together. The problems will hereinafter be taken up in order.

Referring to Figure 1 it will be apparent that the exposed portion of a bank of keys comprises a series of so-called white keys, such as 1, which are used for the natural tones and a series of so-called black keys, such as 2, which are employed for the sharps and flats. The black keys are substantially uniform in construction, are shorter in the exposed portion than the white keys, and lie between various adjacent ones of the white keys. The white keys in their extensions beyond the black keys are broadened out so as to come together with such spacing as may be desired. As a consequence it is convenient to regard each white key, such as the key marked 1, as having a relatively wide forepart 1a and a relatively narrow rearwardly extending shank 1b.

It will be understood that the shanks of the white keys and tail portions of the black keys extend rearwardly to a position where they are hidden in the musical instrument by some sort of key strip or front board. For convenience I shall herein refer to these hidden prolongations of the shanks as the tail portions of the keys. Ordinarily the key tail portions are uniform or substantially so for the black and white keys, although in different instruments they may have widely varying conformations. For example, in an organ the key tails may terminate a short distance behind the key strip or front board; the key tails may be pivoted substantially at their ends and they may be arranged either directly or by means of lever arms to operate switches. In other organ constructions the key tails may be pivoted intermediate their ends so that as a key is moved downwardly the rear end of its tail moves upwardly. In a piano construction the key tails are not only usually pivoted intermediate their ends but are also prolonged to a very considerable extent rearwardly beyond the pivot point so as to bring the rear ends of the tails into coincidence with the operating elements of a piano action. In some constructions the tails of the keys have non-rectilinear conformations where the appropriate action elements are not located directly behind the keys. These variations, which are well understood by the skilled worker in the art, do not form a limitation on the present invention. The constructions hereinafter set forth are applicable to all types of keys for pianos, organs and the like irrespective of the nature of the key tails; and hereinafter I shall use the term shank as inclusive of any integral tail construction which the key may have.

Still referring to Figure 1, it will be seen that the C key 3 has a fore-part 3a and a shank 3b which joins the fore-part at the left hand side thereof. The next, or D key 5, has a fore-part 5a and a shank 5b; but the shank joins the fore-part substantially centrally thereof. The next or E key 6 has a fore-part 6a and a shank 6b; but the shank joins the fore-part at the right hand edge thereof. The F key 1 is substantially like the C key 3; but in the G key 7 the shank joins the fore-part neither at the center nor at the right or left hand edges but rather somewhat to the left of the center as shown. The A key 8 is also different from any other key in that it is substantially the reverse counterpart of the G key 7. The B key 9 is essentially like the E key 6.

The above are the variations in form of the keys in an octave of the standard keyboard. But for the sake of uniformity of spacing, or when a keyboard section has hitherto been made by cutting a single piece of wood with gang saws, there have of necessity been variations in the width of the white key shank portions, which further complicates keyboard construction.

Hitherto the keys of musical instruments have, for the most part been made of wood and covered above and on the front ends with pieces of ivory or plastic. It has also been suggested that the keys of instruments be molded of some suitable plastic. The problems involved in either mode of construction are complicated not only by the wide variations set forth above in the actual conformation of the keys themselves but also in certain variations of dimensions which have been current in the art. Thus if the keys are made of wood a relatively large number of wooden pieces of differing conformation must be produced. This makes for expense and substantial wastage of materials. Similarly if keys are molded from a suitable plastic a relatively large number of molds must be made because of the variations in key conformation and dimensions; and this is expensive in equipment cost.

Briefly, in the practice of that form of my invention which is addressed to key construction, I prefer to make all of the key shanks of uniform dimensions, to divorce the key shanks from the key fore-parts in the white keys and to provide key fore-parts which may be attached to key shanks in various positions as determined by jigs or otherwise. This very greatly simplifies and cheapens the construction of the keys themselves. It may be accomplished in various ways. An exemplary way is illustrated in Figures 2 to 5 inclusive. Here I have shown a key construction having a shank element 10 and a fore-part 11. The shank element may be of wood, molding composition, or metal as desired. It is of uniform cross section excepting at the forward end where it is notched as at 13 so as to provide an extension 15 of lesser cross section. The shank itself in this instance is of full key length; but it is only of shank width as will be clear from Figure 2. The key fore-part 11 is of box like construction. It may be made most conveniently either of metal or of plastic. In its preferred form it has a top element 17, side elements 18 and 19, and a front element 20. Usually the top element extends slightly beyond the front element so as to form a decorative lip 21. The box shaped construction has neither a bottom wall nor a rear wall; but in the exemplary construction there is an interior projection or wall 22 located inside the front wall 20 and between the side walls 18 and 19 to all of which walls it is attached. This forms a supplementary box-like construction within the key fore-part and designed and dimensioned to accept the key shank 15.

The key fore-part may be engaged with the shank element 10 most clearly shown in Figures 4 and 5. It will be seen that the shank element is narrower than the key fore-part and that the key fore-part may be moved laterally with respect to the key shank. Thus the two elements may be joined with their axes coincident as in Figure 5 which would be appropriate for a D or F key. Or the shank may be joined to the key fore-part off-center as in a G or an A key. Yet again the shank may be joined to the key fore-part so that the shank lies either at the left or at the right of the key fore-part as may be required for C, E, F or B keys. Although not illustrated in Figures 2 to 4 it is within the scope of my invention to relieve the sides of the shank where they are embraced within the box-shaped key fore-part by the dimensions of the side elements 18 and 19. The position of the shank and the key fore-part is most conveniently determined and adjusted by means of jigs or fixtures; and the shank may be conveniently and permanently attached to the key fore-part by means of a suitable cement or adhesive. It will be seen that by the provision of a suitable standard shank and a suitable standard fore-part I can produce all of the conformations of white keys required in a musical instrument. For finishing purposes the shank in its exposed portion may be capped as at 23 with a piece of plastic or other suitable material, or may be enameled. The capping 23 may overhang, if desired, to eliminate the relieving of the sides of the shank 10.

Variations of construction are possible. As shown in Figure 6 the shank 10 may be tapered at its forward end as at 24 to meet the forward extension 15. In this modification I have also shown a forwardly extending lip 25 at the bottom of the front wall 20. This lip may be used to fix the upward position of the key by engagement with a rearwardly extending lip 26 on a key strip or other element.

In many organ keyboards the front portions of the white keys are relatively thin, the keys tapering on their bottoms forwardly and becoming wider rearwardly as is well known. This may be accomplished as in Figure 7 by providing instead of a front wall 20 a partial bottom wall element 27 extending rearwardly and downwardly and provided if desired with a downward lip 28. The shank 10 may be appropriately configured at its forward extension 29 to fit between these elements and the top wall 17 as shown.

Another type of construction is illustrated in Figures 8 and 9. Here I have shown a shank element 30 of shank width and a fore-part body element 31 of forepart width. These elements are configured for interengagement as shown, the shank part having upwardly extending teeth or detents 32 and 33 while the fore-part body element has downwardly extending teeth or detents 34 and 35. Such configurations are designed to provide a large surface area on each part which can be brought together for adhesive union, but it will still be apparent that by means of suitable jigs or fixtures the shank body may be positioned differentially with respect to the key fore-part body so as to provide all of the white key constructions required for a musical instrument.

The shank body and the key fore-part body may each be made of wood as illustrated in Figures 8 and 9; and it will be evident that these wood parts may be cut without substantial waste. The key fore-part may be finished by a cap piece 36 of ivory or plastic and by a front piece 37, while the shank element may be finished by a cap piece 38.

Figure 10 illustrates another variant of the same type of construction. Here the key shank is formed primarily by a metal channel 39, a piece 40 being fixed at the forward end of the channel as by rivets 41. The piece may be of wood or plastic and will preferably be configured as shown to provide the detents aforesaid. The key fore-part may be made of wood or, as illustrated of plastic. In this event it will have a top wall 42, a front wall 43, side walls, one of which is illustrated at 44 and a rear configuration 45 shaped to provide matching teeth for interengagement and adhesive union with the part 40. The shank 39 may be suitably capped as at 46.

Various interlocking or interengaging configurations between a shank and a key fore-part may be employed. For example, as shown in Figures 11 and 12 the key shank 39 may have fastened to it a piece 47 which has a forward extension 48 with an enlarged head 49. The key fore-part body 50 which may be of wood or of plastic or metal has a rear portion configured as shown to accept the extension and head 48, 49. It will be evident that when these parts are interengaged as shown, the key fore-part body may be moved laterally with respect to the shank. The desired positions of the parts may be determined by jigs or fixtures and the permanent union of them in the desired conformation may be produced adhesively. The parts may also be fixed mechanically if desired. For example, if the key fore-part 50 is made of metal or of a suitably tough plastic it may be perforated and threaded to accept a set screw as at 51 for this purpose.

Where hereinabove I have spoken of key fore-parts as being made of plastic, it will be understood that these can be made as individual pieces by injection molding or other suitable techniques. Where the fore-parts are made of metal, these can be fabricated from sheet metal cut to the proper shape and bent or formed, with the parts soldered, brazed or welded as desired, or individual elements may be made as such by die casting or the like. However, there are cheaper ways of making such parts from either plastic or metal such as by molding or extruding elongated forms, afterward cutting these forms into desired dimensions by means of saws or otherwise. By way of example, the key fore-part bodies shown at 31 in Figure 9 or 50 in Figure 12, may be extruded from plastic in the form of elongated or continuous bars and cut apart to form the desired pieces of key fore-part width. It would not be possible by an extrusion process to produce the completed key fore-part structures, for example, of Figure 2; but here it is possible by extrusion techniques to provide in elongated bar form a structure consisting of the top member 17, the front wall 20 and the interior wall 22. Similarly, the structure shown in cross-section in Figure 6, the key fore-part shown in cross-section in Figure 7, that shown in cross-section in Figure 10 and many others can be extruded from suitable dies and cut in pieces after hardening. This will not provide complete key fore-part structures since the side walls will be missing; but side wall elements are relatively easily provided in separate operations which will now be described.

Referring to Figures 13 and 14, I have here shown a key fore-part structure comprising a top wall 52, a front wall 53 and a turned-over lip 54. This is an example of a structure which may be made by extrusion either from metal or from plastic. Side walls, such as the wall 55 shown in Figure 13, may be separately formed from sheet stock by dieing or otherwise and may be attached to suitably cut lengths of the key fore-part structure. As illustrated in Figure 13, side elements such as the element 55 may be assembled with the key fore-part construction comprising elements 52, 53 and 54 in a suitable jig or fixture. If the materials are formed of plastic, the elements may be joined through the use of suitable solvents or cements. I have shown a side wall element 55 fitting beneath the top wall 52 and behind front wall 53 and cemented in position. The reason why side wall elements are necessary on hollow key fore-part structures is that if no side walls were provided, the fingers of the operator might catch beneath the top wall of the fore-part of one key when the adjacent key was depressed. At the same time the keys of a musical instrument are not normally depressible the full thickness of a key, so that side wall elements such as 55 may be foreshortened vertically as shown in Figures 13 and 14.

In Figures 15 and 16 I have shown a type of construction in which the key fore-part has a top wall 56 and a front wall 57; but there is a fin or wall 58 depending from the top wall. The key shank 59 will be grooved above to receive this fin, as at 60. When such a part is made by extrusion, and then it is desired to fit side wall elements such as 61 beneath the top wall and behind the front wall, it will be necessary to remove end portions of the fin 58 as will be clear. This may readily be done by grinding or cutting. If the structure is made of plastic, the side wall elements 61 may be cemented in place as above described by the use of a solvent or adhesive, including the uniting of the side wall elements to fore-shortened end portions of the fin 58. If such structures are made of extruded metal, end wall elements may be fastened in place by soldering, brazing or the like.

A modified form of construction is shown in Figures 17 and 18 including a means for mechanically fastening the shank and the key fore-part together. Here I have shown the key shank as having a forward extension 63 terminating in a downwardly directed tooth or detent 64. The key fore-part may be a solid body 65 of wood, metal or plastic, or it may be a hollow element as shown in Figure 18 and comprising a top wall 66, a front wall 67 and an interior downward projection 68. In either event, however, the key fore-part will be provided with a rearwardly extending portion 69 having an upwardly extending detent 70 engageable behind the detent 64. This provides a construction in which the key fore-part is laterally displaceable with respect to the shank. While it is possible to cement such a construction, it is also equally possible to fasten it together mechanically after the parts have been correctly positioned either by measurement or preferably by the use of a jig or fixture. The fastening may be accomplished by means of a screw or bolt 71 having a washer 72 which engages both the shank 62 and the key fore-part clamping them together as shown. In order to permit the washer to tilt, the shank element may be relieved as at 73. The bolt or screw head and the washer may, if desired, lie within a recess 74 formed in the shank and the key fore-part.

A variant construction is shown in Figure 19 where the shank element 75 has a lower forward extension 76 of substantial width. The key fore-part is a body indicated at 77 having a transverse recess formed in its bottom to accept the extension 76. The shank is, of course, of shank width, while the key fore-part body is wider. They may be adjusted with respect to each other laterally, as has been described, and they may then be fastened in position either adhesively (since a large mating surface has been provided) or by means of bolts, screws or the like, not shown.

Other variants of construction involving shanks and key fore-parts adjustable laterally with respect to each other may be employed.

In the provision of keys for musical instruments, it has hitherto been the practice to pivot the keys through the engagement of a metallic post extending upwardly from a key bed and entering a hole in the key body. The pivoting must be done at a point remote from the key ends; but it is also necessary to guide the keys to prevent lateral displacement and interference. This is normally done by providing metallic posts on the key bed near the front ends of the keys which posts ride in additional holes in the key bodies. In some instances where the keys have extremely long tails, an additional guide is provided for the key in the tail portion. Beyond this, it is necessary to provide some abutment means to determine the level of the keys in their uppermost positions as well as in many instances to provide spring means to return the keys to their uppermost positions. The location of a very large number of upstanding pins (at least two for each key) on a key bed, is a matter of considerable expense in hand work involving usually multiple drilling operations and the hand setting of the pins. The formation of the holes or sockets in the keys and the lining of these holes with felt, is again a matter of very great expense especially since each key has to be drilled separately with oval openings since the placement of these openings will vary from key to key.

As indicated above, a second primary object of my invention is the provision of a new keyboard construction and assembly in which substantial savings may be made over constructions hitherto known. My new concept involves the idea of guiding the keys on or with respect to each other. This is to be sharply distinguished from the idea of guiding each key with respect to a key base. In my assembly it is necessary only to guide the end keys of a keyboard with respect to the key bed, or so to guide only occasional keys throughout the length of the keyboard. I am enabled to do this because the keys are not subjected to any great force tending to displace them laterally and a slight degree of lateral displacement, should it occur, will not interfere with the operation of the instrument so long as adjacent keys do not tend to interengage or interfere with the operation of each other. Moreover, I am able to guide the keys with respect to each other, as hereinafter set forth, because in accordance with that aspect of my invention described above and having to do with key construction itself, the parts I employ are of standard width and dimensions, so that the interspacing between keys, while it may vary slightly from key to key in an octave, will be standard as respects corresponding keys throughout the scope of the keyboard and all similar keyboards will be identical in construction.

In Figure 20 I have illustrated a white key having a shank 78 and a key fore-part indicated generally at 79. The key fore-part has side wall elements 80, one of which is provided with a protruding, vertically disposed spacer, shown at 81. This spacer may be formed integral with the side wall element 80 or attached thereto as may be desired. In the former instance it may be found convenient to extrude the side wall and spacer in the form of a bar which is afterwards cut apart into individual elements, such as illustrated in Figure 21, which elements are then joined with hollow fore-part elements in the ways described above. Needless to say, where the key fore-part elements are in the form of solid bodies, the spacing pads or elements 81 may be attached thereto as desired.

Referring to the assembly partially illustrated in Figure 25, it can be seen how the spacing elements 81, 81a, etc. space the fore-parts of the white keys from each other. In this embodiment of the invention, a separate means is provided for the spacing of the black keys from and by means of the white keys. As seen in Figure 22, each black key comprises a shank element 82 of wood or other suitable material surmounted by a black key body 83 of plastic, colored wood or suitable material. To the ends of the shanks 82, I fasten plates 84 which, being wider than the shanks 82, extend from these shanks to the adjacent shanks of white keys serving to center the shanks of the black keys between them, as will be apparent. It will also be apparent from the interrelationship shown in this figure that if the end keys of a keyboard or a sub-division thereof, such as an octave, be guided with respect to a key bed, the other keys in the assembly will not get out of line because they are guided with respect to each other.

I am not limited as to the materials from which the guiding elements 81 and 84 are made. They should have such a relationship with the elements which they engage as to eliminate the danger of extraneous noise such as squeaking or the like. But while metal rubbing against metal would give rise to a danger of extraneous noise, ordinarily plastic rubbing against metal is free of this difficulty, as is plastic rubbing against plastic or either plastic or metal rubbing against wood. However, it is within the scope of my invention to make the spacing elements of other materials such as hard felt, vulcanized fiber or the like, or to face the portions of adjacent keys against which they rub with such materials as felt or leather.

In Figure 23 I have shown a construction in which the spacer 84 on a black key shank 82 is prolonged downwardly and is provided with an upwardly turned lip 85. This lip may be caused to engage under the head 86 of a T-shaped bar or bracket affixed to a key bed, this construction fixing the upper portion of the black keys of the assembly. In a similar fashion (as shown in Figure 24), the side wall element 80 of a key fore-part may be formed with a downward extension 87 having a rearwardly turned lip 88 for engaging beneath the head 86 of the same bar. This provides a convenient and inexpensive stop construction for a type of keyboard, ordinarily one used in organs where the keys do not extend much, if any, distance beyond their pivot points. Where keys have long rearwardly extending tails and are pivoted at a point remote from their rearward ends, it is convenient to provide a rear stop bar as is the conventional practice. The extension 87 may also be used for key guiding purposes if desired.

Since the shanks of my keys are uniform in dimensions, both for the white keys and the black keys, it will sometimes be found convenient to make them of metal instead of wood or plastic, and this is particularly the case where the metal chosen is a light metal such as aluminum, or alloys of aluminum and magnesium. I have illustrated in Figure 26 a black key construction wherein the shank 89 is in the form of a channel of light metal. Such shanks may be produced by forming sheet metal or by extrusion, as desired. The black key additionally comprises a black key body 83, as above, which may be attached to the shank in any convenient fashion. The shank has also been cut at its forward end to provide a pair of extensions 90 and 91 which can be caused to underlie an angularly shaped sheet metal element 92 attached to the key bed in any convenient fashion and serving as a guide, or as a stop to fix the upper position of the keys. A mating white key construction is shown in Figure 27 as comprising a light metal channel element 93 to which a key fore-part 94 is atached. The particular key fore-part is similar to that shown in Figures 13 and 14 but other forms may be employed as will be apparent. The shank 93 has been cut away as at 95 to provide hollow and forwardly extending lips or projections 96 corresponding in position to the projections 90 and 91 in Figure 26, so that they can engage beneath the turned-over portion of the same angular element 92 on the key bed.

A keyboard or assembly making use of the structures of Figures 26 and 27 may easily be designed in such a way as to permit the guiding of the keys on each other. This is accomplished by attaching guiding pads 97 and 98 to one side of the respective key shanks 89 and 93. Reference to the assembly partly shown in Figure 28 will indicate how each shank guides the next succeeding shank, the fore-parts of the white keys being in this instance free of guiding means. The guide pads 97 and 98 may be made of any suitable material including pads of felt or the like. It may be noted that while the object of key guiding it to prevent interference by one key with another, it is not necessary in the accomplishment of this object that minor degrees of key displacement be prevented. Consequently, in the construction shown in Figure 28, relatively soft materials, such as felt pads, may be employed for guiding, and it is an advantage that the guide means may all be in alignment as shown and that the fore-parts of the keys need not be provided with guiding means. The construction illustrated in this figure is, of course, not limited to use with keys having metallic shanks, but is equally applicable to keys having shanks of wood, plastic or the like.

The improvements outlined above enable me to employ simplified and less expensive means for pivoting my keys. I have shown in Figure 29 a structure of spring metal of comb-like configuration and comprising a base element 99 and a plurality of spring teeth 100, one for each key in an assembly. The base element 99 may be affixed to a key bed in any suitable fashion and the ends of the key shanks may be fastened respectively to different ones of the spring fingers 100 as by rivets, screws or bolts. In a variant construction, as shown in Figure 31 the base 99 may be fastened to an overhead bracket 101, the shanks 102 of the respective keys being fastened as before to the fingers 100 which now, however, extend downwardly. Such constructions take care of instances where the key shanks are to be pivoted at their ends. Where, however, the shanks are to be pivoted intermediate their ends, I preferably adopt a construction such as that shown in Figure 30. Here a bracket element in the form of a metallic angle 103 is suitably affixed to the key bed 104, by screws or otherwise. The base 99 of the comb-like construction is bolted to the upwardly extending portion of the bracket element. The key shanks 105 overlie the upper ends of the spring fingers 100. The fingers are bolted to a downwardly extending leg of bracket elements 106, the horizontal legs of which are in turn attached to the key shanks by riveting or bolting, or by screws or in other appropriate ways. In a reversal of the structure shown in Figure 30, the mounting means may extend upwardly from the key shanks to an overhead key rail.

By making the element illustrated in Figure 29 of suitable springy material and of suitable stiffness, the need of any other spring means to return keys to their undepressed positions in an organ or similar instrument may be obviated; and the spring fingers 100, as will be evident, also may have (unlike the pivoting means of conventional form) a strong tendency to maintain key alignment.

Modifications in my invention may be made without departing from the spirit of it. By constructions such as those shown in exemplary embodiments above, I have succeeded not only in very greatly simplifying and cheapening the production of keys themselves (which keys may otherwise be conventionally employed) but I have also succeeded in very greatly simplifying and cheapening keyboard assemblies inclusive of keys, key bed and appurtenant apparatus. I have succeeded in forming keys from parts all of which are standard and few in number, and in particular, I have succeeded in producing white keys from shank elements of uniform construction and dimensions and from key forepart members also of unitary form and dimensions. Keyboards formed from my elements as taught above, are much more uniform and accurate in dimensions than those hitherto current in the art. Further economies can be made in various ways. For example, where a plastic key fore-part or a key fore-part which is covered with ivory or plastic is joined to a shank of wood or metal in accordance with my invention, if the upper surface of the shank lies at the same level as the upper surface of the key fore-part, it will be found that a coating of suitable enamel on the top surface of the shank is all that is required for appearance and serviceability. Where my keys or key elements are made from molded or extruded parts, the great diminution in the number of different parts required enables me to make further economies such as the concurrent or integral molding of a black key shank and a black key body. Very great economies in labor and materials are effected by the simplification of the assembly including the key bed as desired. Where the removability of individual keys is a desideratum, the keys may be pivoted on posts as has been current in the art. Even here, however, substantial economies are effected because the keys may be guided on each other as hereinabove described, and because the key shanks may be all of uniform dimensions and uniformly spaced so that the location of pins on a key bed can be accomplished by the use of gang drills and the like. Indeed, the formation of white keys from a shank element and a key fore-part element, which are laterally adjustable with respect to each other, simplifies the production of key assemblies even where pins are used both for pivoting and for guiding. In constructions having interfitted parts, such as those shown in Figure 10 or 18 by way of example, it does not constitute a departure from my invention to provide the interfitting parts with transverse teeth or ridges employable for the determination of a plurality of laterally adjusted positions. In other words, the parts may be so formed that they will fit together only in, say, five positions of adjustment corresponding, for example, to C, D, E, G and A keys, thus obviating the use of jigs or fixtures.

Having thus described my invention in certain exemplary embodiments, what I claim as new and desire to secure by Letters Patent is:

1. In a white key assembly for a musical instrument, a plurality of white keys each comprising the combination of a separate shank and a separate key fore-part wider than the said shank, all of the said shanks being substantially identical and all of the said key fore-parts being substantially identical, the said plurality of white keys being characterized by different white keys in which shanks are attached to key fore-parts in different laterally adjusted positions.

2. The structure claimed in claim 1, wherein the key shank and the key fore-part are configured for inter-engagement and sliding movement in a lateral direction.

3. The structure claimed in claim 1, wherein the key shank and the key fore-part are configured for inter-engagement and sliding movement in a lateral direction, and wherein the parts are permanently engaged in a selected laterally adjusted position adhesively.

4. The structure claimed in claim 1, wherein the key shank and the key fore-part are configured for inter-engagement and sliding movement in a lateral direction, and wherein the parts are permanently engaged in a selected laterally adjusted position by mechanical means.

5. The structure claimed in claim 1, wherein the key fore-part is a box-shaped element, the key shank having means for engagement therein in laterally adjusted position.

6. The structure claimed in claim 1, wherein the key fore-part is a box-shaped element having a top, side walls and a front portion, and in which the shank engages therein in laterally adjusted position.

7. The structure claimed in claim 1, wherein the key fore-part is a box-shaped element having a top, side walls and a front portion, and in which the shank engages therein in laterally adjusted position, and in which said box-shaped element has at least one inwardly extending configuration engageable with said shank, said shank being configured to accept said last mentioned configuration.

8. The structure claimed in claim 6, wherein one of said side walls carries a spacing pad whereby said key may be guided against an adjacent key.

9. The structure claimed in claim 6, wherein one of said side walls carries a spacing pad whereby said key may be guided against an adjacent key, and wherein one of said side walls has a downwardly depending hooked extension.

10. A key assembly for a musical instrument comprising black and white keys, each of said keys having a shank portion of substantially uniform cross-sectional dimensions, said shank portions being substantially uniformly spaced in said assembly, the shank portions for the black keys of said assembly bearing upwardly extending black key bodies, the shank portions for white keys in said assembly bearing forwardly extending key fore-parts of greater width than said shanks, said shanks and said key fore-parts being separate elements affixed together in different laterally adjusted positions.

11. A key assembly for a musical instrument comprising black and white keys, each of said keys having a shank portion of substantially uniform cross-sectional dimensions, said shank portions being substantially uniformly spaced in said assembly, the shank portions for the black keys of said assembly bearing upwardly extending black key bodies, the shank portions for white keys in said assembly bearing forwardly extending key fore-parts of greater width than said shanks, said shanks and said key fore-parts being separate elements affixed together in different laterally adjusted positions, and means on said keys for guiding said keys from each other.

12. A key assembly for a musical instrument comprising black and white keys, each of said keys having a shank portion of substantially uniform cross-sectional dimensions, said shank portions being substantially uniformly spaced in said assembly, the shank portions for the black keys of said assembly bearing upwardly extending black key bodies, the shank portions for white keys in said assembly bearing forwardly extending key fore-parts of greater width than said shanks, said shanks and said key fore-parts being separate elements affixed together in different laterally adjusted positions, and means on said keys for guiding said keys from each other, said last mentioned means comprising guiding pads on the fore-parts of the white keys for engaging adjacent white keys and guiding plates on the ends of the black key shanks for engaging adjacent shanks of white keys.

13. A key assembly for a musical instrument comprising black and white keys, each of said keys having a shank portion of substantially uniform cross-sectional dimensions, said shank portions being substantially uniformly spaced in said assembly, the shank portions for the black keys of said assembly bearing upwardly extending black key bodies, the shank portions for white keys in said assembly bearing forwardly extending key fore-parts of greater width than said shanks, said shanks and said key fore-parts being separate elements affixed together in different laterally adjusted positions, and means on said keys for guiding said keys from each other, said last mentioned means comprising guiding pads or side portions of the several key shanks.

14. The structure claimed in claim 12, in which the key shanks are suitably pivoted with respect to a key bed and in which less than the full number of keys are guided on said key bed.

15. The structure claimed in claim 13, in which the key shanks are suitably pivoted with respect to a key bed, less than the full number of said keys being guided on said key bed.

16. The structure claimed in claim 14, wherein said keys are pivoted with respect to said key bed by means of spring fingers.

17. The structure claimed in claim 15, wherein said keys are pivoted to said key bed by means of spring fingers.

References Cited in the file of this patent

UNITED STATES PATENTS

| | | |
|---|---|---|
| 162,467 | Fuller | Apr. 27, 1875 |
| 174,000 | Pratt | Feb. 22, 1876 |
| 206,345 | Milliken | July 23, 1878 |
| 1,200,182 | Evans | Oct. 3, 1916 |
| 1,958,227 | Barnett | May 8, 1934 |
| 2,117,002 | Hammond | May 10, 1938 |
| 2,195,238 | Cervenka | Mar. 26, 1940 |
| 2,530,712 | Martin | Nov. 21, 1950 |
| 2,530,832 | Martin | Nov. 21, 1950 |
| 2,584,319 | Appel | Feb. 5, 1952 |

FOREIGN PATENTS

| | | |
|---|---|---|
| 56,596 | Germany | May 14, 1891 |